April 15, 1952 G. W. CURTIS 2,592,541
SELF-CLEANING ENDLESS TRACK
Filed June 14, 1949 2 SHEETS—SHEET 1

INVENTOR.
George W. Curtis
BY
Morsell & Morsell
ATTORNEYS.

April 15, 1952  G. W. CURTIS  2,592,541
SELF-CLEANING ENDLESS TRACK
Filed June 14, 1949  2 SHEETS—SHEET 2
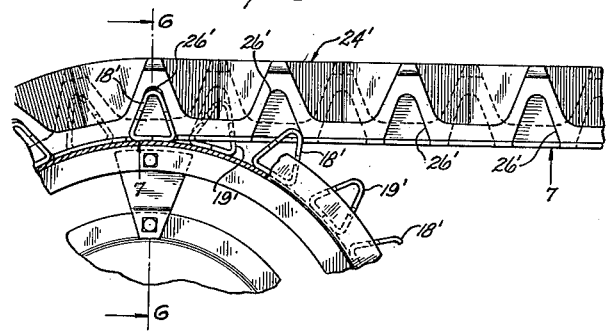
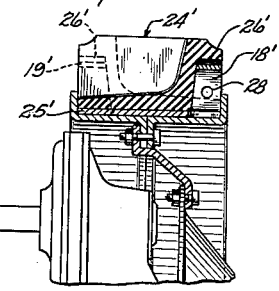
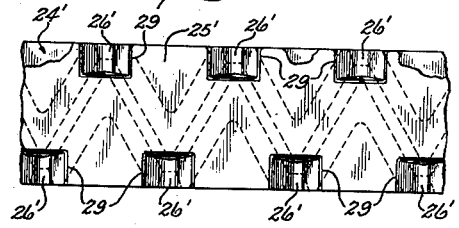
INVENTOR.
George W. Curtis
BY
Morsell & Morsell
ATTORNEY.

Patented Apr. 15, 1952

2,592,541

UNITED STATES PATENT OFFICE 2,592,541

SELF-CLEANING ENDLESS TRACK

George W. Curtis, Wauwatosa, Wis.

Application June 14, 1949, Serial No. 99,062

14 Claims. (Cl. 305—10)

1

This invention relates to improvements in self-cleaning endless tracks.

Continuous rubber band tracks which have heretofore been developed for tractors and other vehicles have been unsatisfactory for several reasons. The flexible nature of the material from which said tracks are made requires the use of a plurality of truck rollers to back up the ground engaging stretches of the track. In addition, when tracks of the type heretofore proposed are operated under muddy conditions, the mud adheres to the inner surfaces of the track and to the truck roller surfaces, forming hard cakes when dry, and results in excessive wear and rapid deterioration.

In the case of endless tracks using an articulated shoe construction similar difficulties have been encountered, and there is rapid wear of the hinge pins thereof. Further, the articulated shoes tend to spank the ground when the vehicle is in motion, thereby causing vibration and discomfort to the operator, and limiting the tractors to a relatively slow speed.

With the above in mind, it is a general object of the invention to provide an endless track which is substantially self-cleaning.

A further object of the invention is to provide an improved positively driven endless track having incorporated therein a longitudinally extending rigidifying member which eliminates the need for truck rollers.

A further object of the invention is to provide an improved endless track having its inner surface formed with a plurality of spaced recesses positioned adjacent opposite side edges thereof, said recesses opening not only toward the inner surface of the track, but also toward the adjacent edge of the track, to permit sand and water to readily clear therefrom.

A further object of the invention is to provide an improved track of the class described which coacts with a pair of sprocket wheels, said sprockets being provided with teeth on the periphery thereof which are arranged in a novel manner and which are positionable in the recesses of said track.

A further object of the invention is to provide an improved sprocket for use with the improved endless track, said sprocket, in one form of the invention, having apertured hollow teeth and having open ends adjacent side edges of the sprocket to permit mud and water squeezed into said teeth from the track recesses to flow out of the open ends of said teeth.

A further object of the invention is to provide

2 a track of the class described wherein the recesses on one side edge are staggered with respect to the recesses on the opposite side edge.

A further object of the invention is to provide an improved track of the class described having an outwardly projecting, zig-zag rib on the outer surface thereof, said rib circumscribing the staggered recesses formed in the inner surface of said track and providing a continuous, flexible, ground contacting element which eliminates vibration to improve the riding qualities, and which has the same action in either forward or reverse movement of the vehicle.

A further object of the invention is to provide a track of the class described wherein the rigidifying member may be a flexible metallic band either running between the rows of recesses in said track, or having a width equal to the width of the track and formed with openings registering with the recesses in said tracks.

With the above and other objects in view, the invention consists of the improved self-cleaning endless track construction, and all of its parts and combinations, as set forth in the claims, and all equivalents thereof.

In the drawing accompanying and forming a part of this specification, wherein are shown two forms of the invention, and wherein the same reference characters indicate the same parts in all of the views:

Fig. 5 is a fragmentary side view of a track and sprocket wheel embodying a modified form of the invention;

Fig. 6 is a fragmentary vertical sectional view taken approximately along the line 6—6 of Fig. 5; and Fig. 7 is a view of the inner surface of the modified form of track taken along the line 7—7 of Fig. 5.

Figure 1:
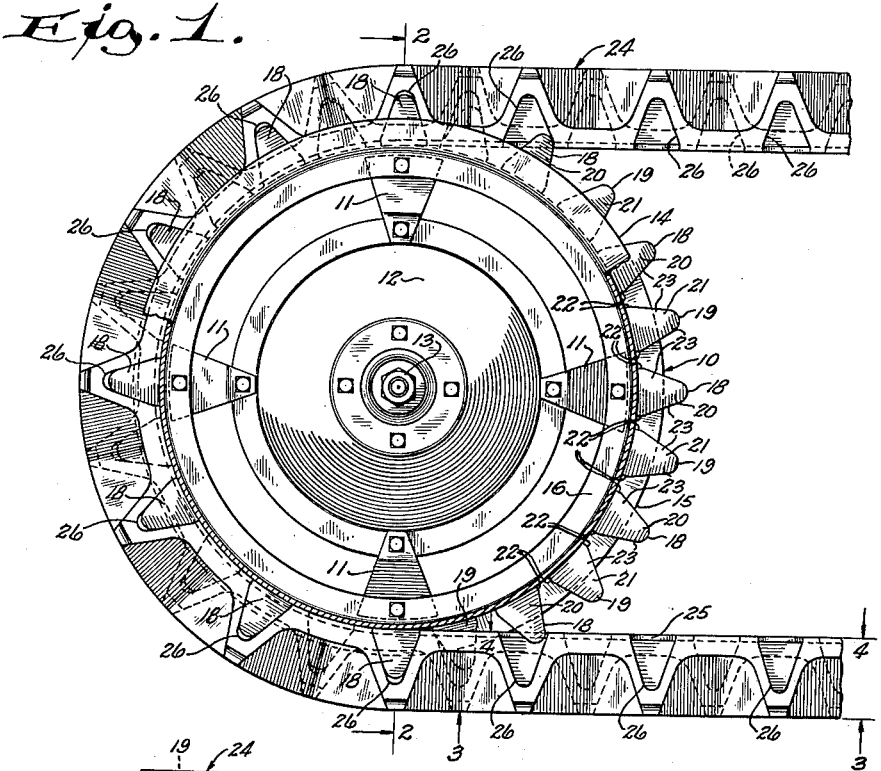
Fig. 1 is a fragmentary side elevational view illustrating an endless track and a sprocket wheel cooperating therewith.
Figure 2:
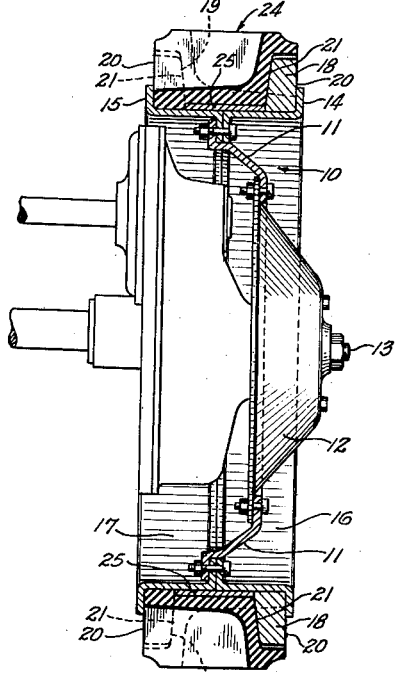
Fig. 2 is a vertical sectional view taken approximately along the line 2—2 of Fig. 1.
Figure 3:
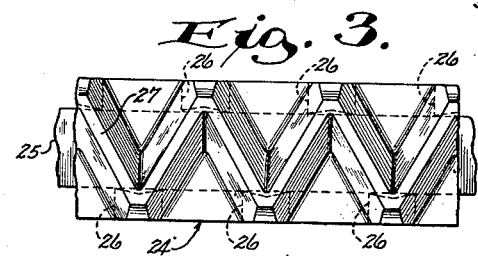
Fig. 3 is a fragmentary view of the outer surface of the improved track taken approximately along the line 3—3 of Fig. 1.
Figure 4:
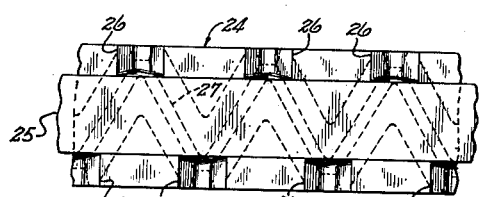
Fig. 4 is a fragmentary view of the inner surface of the improved track taken approximately along the line 4—4 of Fig. 1.

Referring more particularly to Figs. 1 and 2 of the drawing, the numeral 10 indicates a sprocket wheel which may be removably connected, by means of lugs 11, to a wheel disc 12, the latter being suitably fixed to a driving axle 13. The sprocket wheel 10 is preferably channel shaped in cross-section, having a pair of outwardly projecting annular edge flanges 14 and 15. The wheel 10 may be made up of a pair of annular members 16 and 17 of Z-shaped cross section bolted together as shown.

Fixed to the outer periphery of the sprocket wheel 10, inwardly of and adjacent the flange 14 are a plurality of preferably equally spaced solid teeth 18. Fixed to the outer periphery of the sprocket wheel 10 inwardly of and adjacent the flange 15, and staggered with respect to the teeth 18 are a plurality of preferably equally spaced solid teeth 19.

The teeth 18 and 19 are of substantially the same shape and have substantially rectangular bases in contact with the periphery of the wheel 10. The teeth 18 and 19 are formed with substantially flat inner end walls 21 which preferably slope outwardly, as shown.

The teeth 18 and 19 preferably have relatively short side wall portions 22 which extend substantially radially outwardly from the bases of said teeth. Said side wall portions 22 merge with sloping sidewall portions 23, the latter converging to give the teeth 18 and 19 a substantially triangular shape in transverse section.

The sprocket wheel 10 may be a driving wheel or an idler wheel and is circumscribed by an endless track 24 of rubber or other suitable material as shown in Figs. 1 and 2. The track 24 has a substantially flat inner surface in which is embedded a longitudinally extending, flexible, endless, metallic band 25. The metallic band 25 is preferably suitably bonded to the rubber track 24.

The rubber track 24 has a width substantially equal to the spacing between the opposing inner surfaces of the flanges 14 and 15 of the wheel 10. The inner surface of the track 24 is substantially smooth except that it is formed with a plurality of recesses 26 adjacent its edges. The recesses 26 have substantially the same shape as the external shape of the teeth 18 and 19 and are spaced apart substantially identically with said teeth.

The teeth 18 and 19 fit into the recesses 26 to drivingly engage the track 24 when the wheel 10 is a driving member. The recesses 26 open not only toward the inner surface of the track 24, but they also open toward the adjacent side edge, as shown in the drawings. The recesses 26 may be slightly deeper than the length of the teeth 18 and 19 as shown. It will be noted that the recesses 26 are positioned with their inner walls adjacent the metallic band 25, and that as the track 24 travels around the wheel 10, the edges of the metallic band 25 are immediately adjacent the inner faces of the teeth 18 and 19. The combination of the sloping inner faces of the teeth 18 and 19, combined with a metallic band having a width substantially equal to the space between opposite teeth, provides an effective means for keeping the track 24 centered on the wheel 10.

The outer periphery of the rubber track 24 is formed with a continuous outwardly projecting zig-zag shaped rib 27 which extends longitudinally thereof. The rib 27 is so formed on the track 24 that the vertexes thereof are positioned directly over the recesses 26. The rib 27 provides an effective ground gripping member and the tractive effort provided by a driving axle 13 is transmitted substantially without loss through the teeth 18 and 19 and the recesses 26 to said rib.

When operating the improved endless track under muddy conditions, a certain amount of water and mud will tend to accumulate in the recesses 26. However, as the track 24 moves around the sprocket 10, the teeth 18 and 19, upon entering the recesses 26, squeeze the water and mud therefrom, forcing said water and mud out the open sides of said recesses. Since the teeth 18 and 19 occupy substantially all of the space within the recesses 26, substantially all of the water and mud is removed from said recesses by said teeth and therefore the rubber track 24 is automatically effectively cleaned merely by the operation thereof.

The flexible metallic band 25 provides a rigidifying member for backing up the ground engaging stretches of the track 24 and eliminates the need for any truck rollers which have heretofore been required by endless flexible rubber tracks. The elimination of the truck rollers not only reduces the cost of the driving mechanism, but it also eliminates the accumulation of mud which unavoidably collects on rollers of this type. The zig-zag rib 27 provides a continuous, flexible, ground engaging element which has smooth riding qualities. This is due to the fact that there is no spanking action such as that which occurs with tracks having spaced transversely extending ground engaging ribs only, or with those having the articulated shoe type of ground engaging member. In addition, the zig-zag rib of the present construction coacts with the ground the same in either direction of movement, making it particularly suitable for use in two directional tractors.

Figs. 5, 6 and 7 disclose a modified form of the invention wherein the teeth 18' and 19' are hollow and have the side walls thereof each formed with apertures 28 (see Fig. 6). In the modified form of the invention the teeth 18' and 19' have open ends, as shown in Figs. 5 and 6. The shape of the teeth 18' and 19' is, however, substantially the same as that of the teeth 18 and 19 of the principal form of the invention.

In the modified form of the invention, as shown in Figs. 6 and 7, it is to be noted that the flexible metallic band 25' is shown as extending the full width of the rubber track 24', and it is to be noted that the metallic band 25' is formed with rectangular notches 29 which register with the recesses 26' and which are slightly larger in outline than the rectangular bases of the teeth 18' and 19'.

The modified form of the invention has the same self-cleaning characteristics which are inherent in the principal form thereof. However, as the teeth 18' and 19' enter the recesses 26', a certain amount of the mud and water which is collected in the recesses 26' will be forced through the apertures 28 and into the hollow interiors of the teeth 18' and 19'. This mud and water will then flow transversely outwardly through the open outer ends of said teeth. This action further adds to the effective self-cleaning action of the improved track. The metallic band 25', which extends the full width of the rubber track 24' provides a stronger backing for the rubber track than is provided by the metal band 25 of the principal form, and this wider band may be used in either form, if desired. Since the teeth 18' and 19' can transmit tractive effort not only to the side walls of the recesses 26' but also to the metallic band 25', there is a more even distribution of forces throughout the rubber track 24', and points of great stress are thereby eliminated and longer life assured. Except for the metallic band 25', the rubber track 24' is substantially identical with the rubber track 24 of the principal form and therefore has the same inherent operating characteristics.

While it is preferred to have the teeth 19 and 19 and the recesses 26 staggered with respect to each other, the improved track will operate satisfactorily if said teeth and receses are otherwise located. Relative to features shown in the present application and not claimed, reference is made to copending application Serial No. 716,652, filed December 16, 1946.

Various other changes and modifications may be made without departing from the spirit of the invention, and all such changes are contemplated as may come within the scope of the claims.

What I claim is:

1. An endless track for use in a track laying unit having a sprocket wheel provided with peripheral teeth, said track being formed of flexible molded material and having tooth receiving recesses formed in its inner surface, said recesses communicating at one end with a side edge of said track to permit the expulsion of mud therefrom as the driving teeth enter said recesses and said recesses being closed at their opposite ends.

2. An endless track for use in a track laying unit having a sprocket wheel provided with teeth, said track being formed of flexible molded material and having its outer surface formed with at least one outwardly projecting transversely extending rib, there being a tooth receiving recess formed in the inner surface of said track and extending into said transverse rib, said recess also communicating with a side edge of said track to permit the expulsion of mud therefrom as a driving tooth enters said recess.

3. An endless track for use in a track laying unit having a sprocket wheel provided with teeth, said track being formed of flexible molded material and having its outer surface formed with at least one outwardly projecting transversely extending rib, there being a tooth receiving recess formed in the inner surface of said track and extending into said transverse rib, said recess also communicating with a side edge of said track to permit the expulsion of mud therefrom as a driving tooth enters said recess, and endless flexible reinforcing means extending longitudinally of said track adjacent the inner surface thereof, said recess projecting outwardly beyond said reinforcing means.

4. An endless track for use in a track laying unit having a sprocket wheel provided with teeth, said track being formed of flexible molded material and having its outer surface formed with at least one outwardly projecting transversely extending rib, there being a tooth receiving recess formed in the inner surface of said track and extending into said transverse rib, said recess also communicating with a side edge of said track to permit the expulsion of mud therefrom as a driving tooth enters said recess; and endless flexible reinforcing means fixed to and extending longitudinally of the inner surface of said track, said recess projecting outwardly beyond said reinforcing means.

5. An endless track for use in a track laying unit having a sprocket wheel provided with teeth, said track being formed of flexible molded material and having tooth receiving recesses formed in its inner surface adjacent opposite side edges, which recesses communicate with side edges of said track to permit the expulsion of mud therefrom as the driving teeth enter said recesses; and endless flexible reinforcing means fixed to and extending longitudinally of the inner surface of said track, portions of said reinforcing means extending between the recesses in opposite sides of said track.

6. An endless track for use in a track laying unit having a sprocket wheel provided with teeth, said track being formed of flexible molded material and having its outer surface formed with a continuous outwardly projecting zig-zag rib, there being tooth receiving recesses formed in staggered relationship in the inner surface of said track adjacent opposite side edges of said track and extending into the apexes of said rib, said recesses also communicating with side edges of said track to permit the expulsion of mud therefrom as the driving teeth enter said recesses.

7. An endless track for use in a track laying unit having a sprocket wheel provided with teeth, said track being formed of flexible molded material and having tooth receiving recesses formed in its inner surface adjacent opposite side edges, which recesses communicate with side edges of said track to permit the expulsion of mud therefrom as the driving teeth enter said recesses; and an endless flexible metallic band fixed to and extending longitudinally of the inner surface of said track with the side edges thereof adjacent the inner margins of said recesses.

8. An endless track for use in a track laying unit having a sprocket wheel provided with teeth, said track being formed of flexible molded material and having its outer surface formed with at least one outwardly projecting rib, there being tooth receiving recesses formed in the inner surface of said track adjacent opposite side edges of said track and extending into said rib, said recesses also communicating with side edges of said track to permit the expulsion of mud therefrom as the driving teeth enter said recesses; and an endless flexible metallic band fixed to and coextensive with the inner surface of said track, said metallic band being formed with tooth receiving notches which register with said recesses.

9. In a track laying unit, a wheel formed with a plurality of peripheral teeth having inner end walls and positioned adjacent opposite side edges thereof, there being a circumferentially extending surface portion between the teeth on the two sides of said wheel; an endless track formed of flexible molded material; there being recesses formed in the inner surface of said track adjacent opposite side edges thereof for reception of the teeth of said wheel, said recesses also communicating with side edges of said track; and an endless flexible metallic band fixed to and extending longitudinally of said track adjacent the inner surface thereof and engageable with said circumferentially extending peripheral surface portion of the wheel, said band being of sufficient width to cause engagement of edge portions of said band with the inner end walls of said wheel teeth.

10. In a track laying unit, a wheel formed with a plurality of peripheral teeth positioned adjacent opposite side edges thereof, there being a circumferentially extending surface portion between the teeth on the two sides of said wheel; an endless track formed of flexible molded material; there being recesses formed in the inner surface of said track adjacent opposite side edges thereof for reception of the teeth of said wheel, said recesses also communicating with side edges of said track; and an endless flexible flat metallic band fixed to and extending longitudinally of the inner surface of said track and engageable with said circumferentially extending peripheral surface portion of the wheel, said band having a width at least substantially equal to the width of said circumferential wheel surface portion.

11. In a track laying unit, a wheel formed with a plurality of peripheral teeth positioned in staggered relationship adjacent opposite side edges thereof, there being a circumferentially extending surface portion between the teeth on the two sides of said wheel; an endless track formed of flexible molded material; a continuous outwardly projecting zig-zag rib formed on the outer surface of said track, there being recesses formed in staggered relationship in the inner surface of said track adjacent opposite side edges thereof and extending into the apexes of said rib for reception of the teeth of said wheel, said recesses also communicating with side edges of said track; and an endless flexible reinforcing member extending longitudinally of said track adjacent the inner surface thereof and engageable with said circumferentially extending peripheral surface portion of the wheel.

12. In a track laying unit, a wheel formed with a plurality of peripheral teeth positioned in staggered relationship adjacent opposite side edges thereof, there being a circumferentially extending surface portion between the teeth on the two sides of said wheel; an endless track formed of flexible molded material; a continuous outwardly projecting zig-zag rib formed on the outer surface of said track, there being recesses formed in staggered relationship in the inner surface of said track adjacent opposite side edges thereof and extending into the apexes of said rib for reception of the teeth of said wheel, said recesses also communicating with side edges of said track; and an endless flexible reinforcing member extending longitudinally of said track adjacent the inner surface thereof and engageable with said circumferentially extending peripheral surface portion of the wheel, said reinforcing member being a metallic band and having a width substantially equal to the width of said surface portion.

13. In a track laying unit, a wheel formed with a plurality of peripheral teeth positioned adjacent opposite side edges thereof; an endless track formed of flexible molded material; there being recesses formed in the inner surface of said track adjacent opposite side edges thereof for reception of the teeth of said wheel, said recesses also communicating with side edges of said track; and an endless flexible metallic band fixed to and extending longitudinally of the inner surface of said track, and engageable with the periphery of said wheel, said metallic band having a width substantially equal to the width of said track and being formed with tooth receiving notches in registration with the recesses in said track.

14. In a track laying unit, a wheel formed with a plurality of hollow peripheral teeth positioned adjacent opposite side edges thereof, said teeth having open ends adjacent the side edges of said wheel and having apertured sloping side walls; and an endless track formed of flexible molded material; there being recesses formed in the inner surface of said track adjacent opposite side edges thereof for reception of the teeth of said wheel, said recesses also communicating with a side edge of said track.

GEORGE W. CURTIS.

REFERENCES CITED

The following references are of record in the file of this patent:

UNITED STATES PATENTS

| Number | Name | Date |
|---|---|---|
| 1,480,078 | Kegresse | Jan. 8, 1924 |
| 2,325,690 | Leguillon | Aug. 3, 1943 |